(12) United States Patent
Monaco et al.

(10) Patent No.: US 10,984,437 B2
(45) Date of Patent: Apr. 20, 2021

(54) LINKING AN ADVANTAGE COMMUNICATION SYSTEM TO A PRE-EXISTING PRODUCT

(71) Applicant: Bank of America Corporation, Charlotte, NC (US)

(72) Inventors: Mark Churchill Monaco, New York, NY (US); Tony England, Tega Cay, SC (US); Matthew D. Murphy, Charlotte, NC (US); David C. Tyrie, Boston, MA (US)

(73) Assignee: Bank of America Corporation, Charlotte, NC (US)

( * ) Notice: Subject to any disclaimer, the term of this patent is extended or adjusted under 35 U.S.C. 154(b) by 305 days.

(21) Appl. No.: 15/977,253

(22) Filed: May 11, 2018

(65) Prior Publication Data

US 2019/0147475 A1    May 16, 2019

Related U.S. Application Data

(60) Provisional application No. 62/586,409, filed on Nov. 15, 2017.

(51) Int. Cl.
*G06Q 30/02* (2012.01)
*G06Q 20/40* (2012.01)
(Continued)

(52) U.S. Cl.
CPC ....... *G06Q 30/0238* (2013.01); *G06Q 20/027* (2013.01); *G06Q 20/065* (2013.01); *G06Q 20/102* (2013.01); *G06Q 20/20* (2013.01); *G06Q 20/202* (2013.01); *G06Q 20/227* (2013.01); *G06Q 20/24* (2013.01); *G06Q 20/387* (2013.01);
(Continued)

(58) Field of Classification Search
CPC .......... G06Q 30/0238; G06Q 30/0235; G06Q 30/0227
See application file for complete search history.

(56) References Cited

U.S. PATENT DOCUMENTS

| 7,516,883 B2 | 4/2009 | Hardesty et al. |
| 8,682,791 B2 | 3/2014 | Bies et al. |

(Continued)

*Primary Examiner* — Azam A Ansari
(74) *Attorney, Agent, or Firm* — Weiss & Arons LLP; Michael A. Springs, Esq.

(57) ABSTRACT

A merchant point-of-sale ("POS") system architecture is provided. The POS system architecture may include a POS terminal including a POS receiver, a virtual display and a transmitter, and a transaction processing network including a network receiver and processor. The network receiver may be configured to receive a payment authorization request. The virtual display may be configured to display selectable options. The options may be displayed prior to processing the payment authorization request. The selectable options may include a first and second option. The first option may be to apply a merchant-funded rewards program network to the payment authorization request. The second option may be to continue to apply the default issuer funded rewards program network to the payment authorization request. When the first option is selected, a processor may be configured to terminate the issuer funded reward program network and activate the merchant-funded rewards program network.

9 Claims, 9 Drawing Sheets

(51) Int. Cl.
*G06Q 20/20* (2012.01)
*H04L 9/06* (2006.01)
*G06Q 20/22* (2012.01)
*G06Q 20/02* (2012.01)
*G07G 1/00* (2006.01)
*G06Q 20/06* (2012.01)
*G06Q 20/10* (2012.01)
*G06Q 20/38* (2012.01)
*G06Q 20/24* (2012.01)
*H04W 4/30* (2018.01)
*G06Q 50/00* (2012.01)

(52) U.S. Cl.
CPC ......... *G06Q 20/40* (2013.01); *G06Q 20/4016* (2013.01); *G06Q 30/0213* (2013.01); *G06Q 30/0217* (2013.01); *G06Q 30/0226* (2013.01); *G06Q 30/0233* (2013.01); *G06Q 30/0234* (2013.01); *G06Q 30/0235* (2013.01); *G06Q 30/0258* (2013.01); *G06Q 30/0269* (2013.01); *G07G 1/0009* (2013.01); *H04L 9/0637* (2013.01); *G06Q 50/01* (2013.01); *H04L 2209/38* (2013.01); *H04W 4/30* (2018.02)

(56) References Cited

U.S. PATENT DOCUMENTS

| | | |
|---|---|---|
| 9,665,879 B2 | 5/2017 | Aloni et al. |
| 9,697,520 B2 | 7/2017 | MacIlwaine et al. |
| 9,818,266 B2 | 11/2017 | Murphy |
| 9,836,743 B2 | 12/2017 | Celikyilmaz et al. |
| 9,846,888 B2 | 12/2017 | Perreault et al. |
| 2010/0250379 A1* | 9/2010 | Giordano ............... G06Q 20/00 705/20 |
| 2012/0191525 A1* | 7/2012 | Singh ................. G06Q 30/0233 705/14.33 |
| 2013/0254009 A1 | 9/2013 | Barr |
| 2014/0214509 A1 | 7/2014 | Lee et al. |
| 2014/0372238 A1 | 12/2014 | Murphy et al. |
| 2015/0254615 A1 | 9/2015 | Karim |
| 2016/0232556 A1 | 8/2016 | Postrel |
| 2017/0017942 A1 | 1/2017 | Nix et al. |
| 2017/0330217 A1 | 11/2017 | Postrel |

\* cited by examiner

LINKING AN ADVANTAGE COMMUNICATION SYSTEM TO A PRE-EXISTING PRODUCT

CROSS-REFERENCE TO RELATED APPLICATION

This application is a non-provisional of U.S. Provisional Patent Application No. 62/586,409 filed Nov. 15, 2017 entitled "CUSTOM REWARDS PROTOCOL AND SYSTEM ARCHITECTURE" which is hereby incorporated herein by reference in its entirety.

FIELD OF TECHNOLOGY

Aspects of the disclosure relate to providing apparatus and methods for a custom rewards architecture. Specifically, aspects of the invention relate to providing apparatus and methods for a custom rewards architecture within a pre-existing product with a custom protocol that enables customers, merchants, and issuers to utilize the architecture in real-time.

BACKGROUND

In an electronic payment scenario, a customer (the "customer") may purchase from a merchant or service provider ("the merchant") goods or services ("the product") using credit or by debiting an asset account (for example, using a card such as debit card or card that debits another type of asset account such as a card for debiting a prepaid account, a card for debiting an Automated Clearing House (ACH) account or a card (or other mechanism) for debiting another suitable asset account). The credit may be extended to the customer by an issuing bank (the "issuer"). The asset account may reside at the issuing bank or be held by another entity. The merchant presents the transaction to an acquiring bank (the "acquirer"). The acquirer pays the merchant for (and thus "acquires") the product. A transaction processing network in communication with the issuer and the acquirer settles the transaction between the issuer and the acquirer. The transaction processing network may set transaction processing network fees and collect those fees from the issuer and the acquirer in connection with the settlement.

Conventionally, the issuer was responsible for marketing his card, and therefore, provided points, miles, etc. to cardholders. In the conventional marketplace, the merchant was charged a specific interchange rate, and a substantial percentage of the interchange rate was refunded to the customer using the issuer points or miles system.

There are numerous challenges associated with the above-described conventional architecture. Included in the challenges is that the points and/or miles only market the issuer's card, as opposed to the merchant's product. Although at times a merchant partners with an issuer to produce a branded-card product, this multi-party branding becomes cumbersome overtime and difficult for a customer to track. Additionally, even in the event of a merchant-branded issuer based card, there is no motivation for a customer to maintain a distinct communication with the merchant. Therefore, the merchant is unable to provide the customer with leverage using the "would-have-gotten" points at the time of the sale.

Therefore, a custom rewards architecture with a custom protocol that enables customers, merchants, and issuers to utilize the architecture in real-time is desirable.

It would be further desirable to enable the customer, using the custom rewards architecture, to be capable of maintaining a distinct relationship with the merchant. The issuer preferably benefits from the direct interaction between the merchant and the issuer, thereby increasing sales while using a specific issuer-based card product. It may be further desirable for the merchant to be able to use the points or miles to directly encourage the customer to purchase goods and/or lower prices. It may also be desirable for the customer to receive real-time, accurate, targeted rewards at the point of sale, as opposed to, for example, four weeks later on his/her credit card statement.

SUMMARY OF THE DISCLOSURE

Systems and methods for providing a payment instrument associated with a default issuer funded ("IF") rewards program network with the capability to switch to a merchant-funded ("MF") rewards program network is provided. The method may include receiving from a point-of-sale ("POS") terminal a payment authorization request. The payment authorization request may be initiated by the payment instrument at the POS terminal. When the payment request is received at the POS, the method may include providing a virtual display on the POS including selectable options. The selectable options may include two options. A first option may be to apply the MF rewards program network to the payment authorization request. The first option may enable a customer to receive rewards associated with a merchant of the POS terminal. The second option may be to apply the IF rewards program to the payment authorization request.

The method may further include receiving a selected option from the virtual display. The option selected may be the first option. The option selected may be the second option. The selected option and the payment authorization request may be transmitted to an issuer of the payment instrument to be authorized.

When the first option is selected the method may include processing the payment authorization request. When the payment authorization request is being processed, the method may include determining that the payment instrument is a participant of the MFR program network.

When the payment instrument is determined to be performing as a participant of the MFR program network, the method may further include terminating a first communication exchange. In such an exchange, the first communication exchange may be between the POS terminal and the IF rewards program network. The terminating may further include terminating applying rewards associated with the IF rewards program network for the payment request. The first communication exchange may pre-exist the payment authorization request. The method may further include activating a second communication exchange. The second communication exchange may be a communication exchange between the POS terminal and the MF rewards program network. The activating may further include applying rewards associated with the MF rewards program network for the payment authorization request. In the event that the payment instrument is determined not to be a participant of the MFR program network, the method may further include providing the customer with issuer-based rewards via the IF rewards program network.

In certain embodiments when the first option is selected the method may include providing a virtual display on the POS terminal. The POS terminal may display a selectable plurality of merchant-based rewards associated with the POS terminal. The POS terminal may display one or more of a selection of merchant-based rewards. The merchant-based rewards may include an upgrade, a free item, cashback, an enhanced service and/or a preferred service time.

In response to a selection of the second option, the method may include terminating a second communication exchange. The second communication exchange may be between the POS terminal and the MF rewards program network. The method may further include restarting a first communication exchange. The first communication exchange may be between the POS terminal and the IF rewards program network. The first communication exchange may be the default communication exchange. The method may further include processing the payment authorization request. When the payment request is authorized, the method may further include applying rewards associated with the default IF rewards program network.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1A:
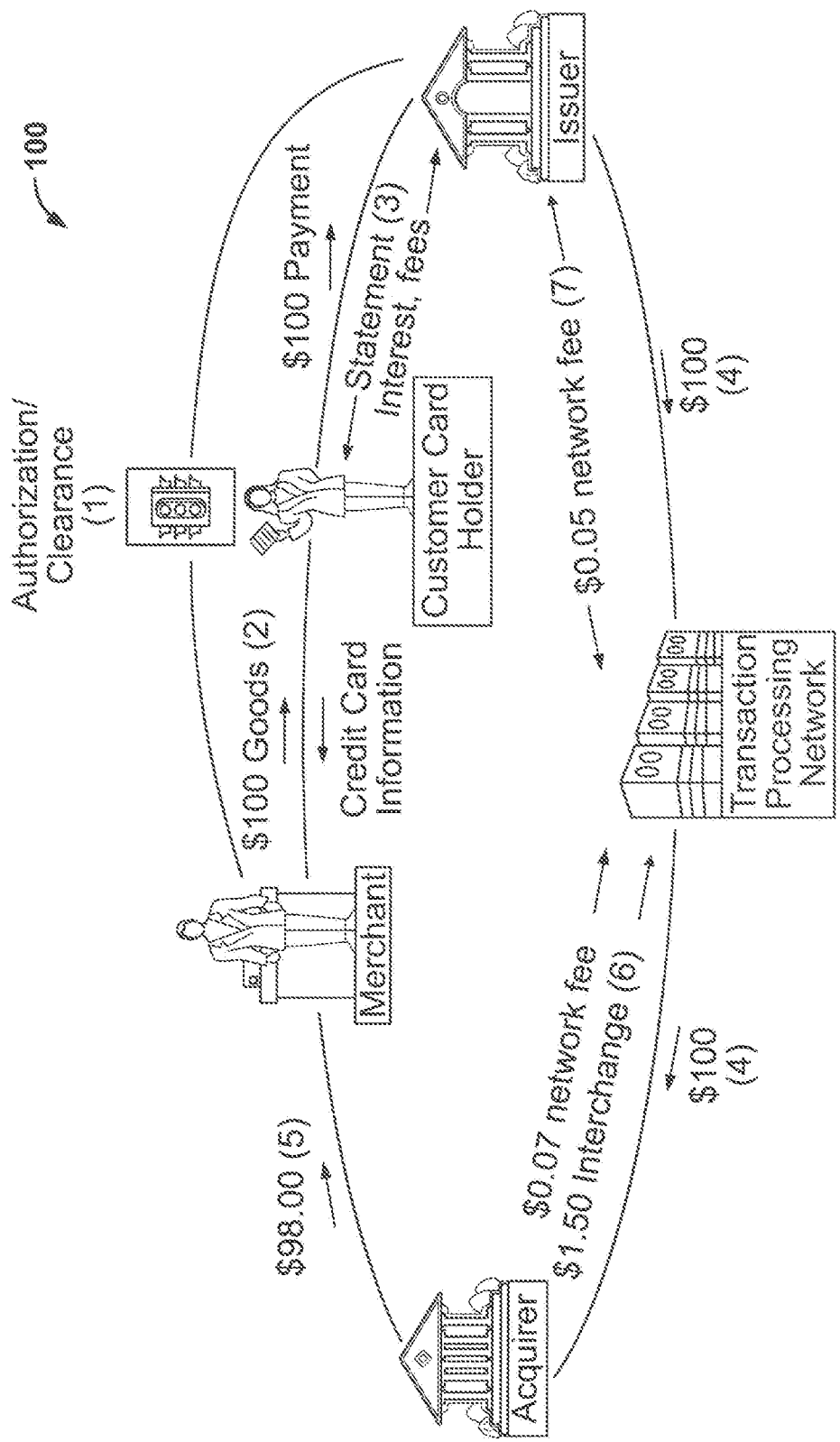
FIG. 1A shows an illustrative system architecture in accordance with principles of the invention.

Rewards programs may deepen current customer relationships and attract new customers. Rewards programs may offer customers incentives to use their payment instruments to purchase goods or services from merchants. Illustrative rewards include perks such as upgrades, cash-back, air lines miles or "points." Points may be utilized to obtain goods or services from qualifying merchants. Customers typically earn points by making qualifying purchases using a payment instrument provided by the issuer.

Typically, rewards programs are funded by the issuer and do not promote merchant specific spend, brand or message.

Merchants pay fees to the acquirer, including terminal rental fees, network fees and other fees, for processing payment instrument payments. Such fees may include fees set by a network. Fees paid by the merchants may be leveraged to compensate an issuer for accepting a credit risk associated with payment instruments and/or compensate an issuer for other costs associated with administering a card program. The issuer may fund rewards or other programs to promote payment instrument usage.

It would be desirable to design a model and associated electronic payment processing architecture that provides customers with reward-type incentives to use payment instruments, but allows issuer to rebate any fees paid by the merchants and allow merchants to control and direct the marketing and loyalty of their brand. Accordingly, it would be desirable to provide apparatus and methods for custom rewards protocols and system architecture.

A merchant point-of-sale ("POS") system architecture is provided. The POS system architecture may include a POS terminal. The POS terminal may include a receiver, a virtual display and a transmitter. The receiver may be configured to receive a payment authorization request. In response to the receipt of the payment authorization request, the virtual display may be configured to display selectable reward options. The selectable reward options may be displayed prior to processing the payment authorization request. The selectable options may include a first and second option. The first option may be to apply a merchant-funded ("MF") rewards program network to the payment authorization request. The second option may be to continue to apply the default issuer funded ("IF") rewards program network to the payment authorization request. The receiver may be configured to receive a selected option from the virtual display. The selected option may be either the first or second option.

At the POS terminal, the transmitter may be configured to transmit the payment authorization request and the selected option to a transaction processing network. The transaction processing network may be associated with an issuer of the payment instrument. The transaction processing network may be configured to receive the payment authorization request. The processor may be configured to process the payment authorization request. The processor may be configured to determine the selected option associated with the request. When the first option is determined to be selected the processor may be configured to terminate a first communication exchange. The first communication exchange may be between the POS terminal and the IF rewards program network. The first communication exchange may be the communication exchange that pre-existed the payment authorization request. When the first communication exchange is terminated, the processor may be further configured to activate a second communication exchange. The second communication exchange may be between the POS terminal and the MF rewards program network. The processor is further configured to process the payment authorization request. The processor may also be configured to apply rewards associated with the MF rewards program network for the payment authorization request.

When the second option is determined to be selected, the processor may be configured to terminate a second communication exchange. The second communication exchange may be between the POS terminal and the MF rewards program network. The termination may take place prior to processing the payment authorization request. In response to the termination, the system may be further configured to restart a first communication exchange. The first communication exchange, which may be the default communication exchange, may be between the POS terminal and the IF rewards program network. The processor may be further configured to apply rewards associated with the IF rewards program network for the payment authorization request.

In another embodiment, a method of electronically processing credit card payments or card that debits an asset account is provided. The method may include receiving a request from a customer. The request may be a request to opt-in to a merchant-funded rewards ("MFR") program network. Opting into the MFR program network may initiate a trigger to switch a communication exchange between the payment instrument and an issuer-based rewards network to a communication exchange between the payment instrument and a merchant-based rewards network. In response to receiving the request the method may further include linking a payment instrument of the customer to the MFR program network. At a point-of-sale ("POS") terminal, the method may include receiving an authorization request from the POS terminal to process a transaction initiated using the payment instrument.

In response to receiving the authorization request from the POS the method may also include determining that the payment instrument is linked to the MFR program network. The method may include determining the linkage within a time-sensitive window. The window may start when a point-of-sale ("POS") terminal of the merchant receives information from the payment instrument. The window may end when the POS terminal receives a response to the authorization request from the issuer. The method may further include determining eligibility for the reward provided by the MFR program network within the time sensitive window. The eligibility for the reward may be based on MFR criteria.

In response to the determination of the linkage between the payment instrument and the MFR program network the method may include terminating a first communication exchange. The first communication exchange may be between the payment instrument and an issuer funded rewards ("IFR") program network. The first communication exchange may be a pre-existing communication exchange. The termination may apply for the authorization request.

In response to the termination of the first communication exchange, the method may further include activating a second communication exchange. The second communication exchange may be between the payment instrument and the MFR program network. The activating of the second communication exchange may include adjusting a fee associated with processing the transaction. The activating of the second communication exchange may further include providing a reward associated with the MFR program network to the customer. The reward provided to the customer may be associated with a first value. The cost of the reward may be associated with a second value. The first value may be higher than the second value. The reward may be an incentive from the merchant to enhance the customers shopping experience. The reward may include an upgrade. The reward may include a free item. The reward may include an enhanced service. The reward may include a preferred service time. The reward may be any suitable reward-type not listed herewith.

The method may also include transmitting notifications to a mobile device of the customer. The notifications may include details of the available rewards for the transaction. The notifications may be displayed on the mobile device via an app running on the mobile device. The app may be provided by an issuer of the payment instrument. There may be a file of criteria relating to eligibility for the reward. The method may include receiving from the POS terminal the criteria. The criteria may be received from the issuer of the payment instrument. The method may further include processing the transaction based on the adjusted fee.

A merchant-funded rewards program may include a custom rewards program. A merchant may identify one or more rewards it wishes to make available to its customers. For example, an eatery may offer a free drink after a customer has spent a requisite amount of money at the eatery or has dined a threshold number of times at the eatery. The merchant may strategically identify a reward that provides a larger perceived value than an actual cost or price of the reward.

Such rewards may be non-monetary such as upgrades, free items, enhanced service and/or preferred service times. Rewards may include monetary rewards such as cash-back. Rewards may be provided instantly at a POS, applied as an instant statement credit or accrued and redeemed at specified or selected times intervals.

Whatever the reward, it is funded by the merchant. In some embodiments, the reward may be jointly funded by the merchant and the issuer. In some embodiments, the merchant may partner with any suitable party to offer and fund a reward.

In some embodiments, the merchant may provide information about available rewards to the issuer. The issuer may promote the reward to customers (e.g., payment instrument holders). For example, the issuer may display the reward to customers from within an app or online banking portal provided to customers by the issuer.

The merchant may promote the available reward. The merchant may promote the reward in its store locations (online or brick and mortar) using any suitable media or medium. The merchant may display the reward to customers from within an app provided to customers by the merchant.

An app running on a mobile device, such as a smart phone, may push notifications to customers regarding available merchant-funded rewards. When the app is provided by a relatively high profile issuer (e.g., an issuer with many more customers than a merchant), the less visible merchants may be provided access to a top tier mobile app and larger pool of customers than would have typically be available to the merchant.

The merchant may leverage availability of the reward to drive customer traffic to the merchant's locations and products/services. The merchant may leverage the reward to drive customer traffic to slower grossing locations. Merchant funding the reward may, directly or indirectly, promote a payment instrument of the issuer and associated spending on merchant products. The issuer may leverage available rewards to drive customers toward specific payment instruments offered by the issuer and associated with the rewards program.

A customer may be required to affirmatively "opt-in" to a merchant-funded rewards program. The customer may opt-in using an electronic platform provided by the issuer or the merchant.

In response to merchant funding of a reward, the issuer may rebate interchange or other fees for transactions involving customers and/or payment instruments that have opted-in or are otherwise associated with a merchant-funded rewards program. The issuer may provide a rebate to the merchant as a way of passing on savings results from merchant funding of rewards. It should be noted that, with respect to this application, the terms "lower" and "refund" as used in conjunction with interchange fees may be understood to be synonymous, or substantially synonymous. The issuer may reimburse, refund or arrange lower interchange fees as a way of passing on savings results from merchant funding of rewards.

Such merchant-funded rewards may increase a volume of payment instrument transactions by enabling and allowing merchants to control a substance of the reward, control marketing associated with promoting the reward and receive a reduction in interchange fees.

However, such a rewards model, while novel and innovative, may be associated with a disruption of traditional electronic payment system architecture.

For example, under the new merchant-funded rewards paradigm, functionality may be required for a customer to choose between standard card reward (e.g., issuer funded rewards) or a merchant-funded reward available from a participating merchant. Functionality would also need to be provided to allow coordination between the issuer and merchant for determining eligibility for rewards and tracking when a reward has been paid out to a customer. This functionality may work with or without participation of the merchant's acquirer.

Such functionality may allow a customer (using a payment instrument) to receive regular product rewards if a merchant-funded reward is not selected or receive regular product rewards if the customer makes a purchase from a merchant that does not participate in the merchant-funded rewards program.

The merchant-funded rewards paradigm may yield reduced cost of acceptance rates for the merchant on purchases associated with activated cards (e.g., customers that have opted-in to a specific reward program offered by the merchant). The paradigm may convert savings on costs of acceptance into directed marketing benefits that may increase sales volume of the merchant. Furthermore, reduced costs of acceptance may be rebated through rebates provided by acquirer to merchant.

The issuer may also derive benefit from partnering with the merchant's promotion of the reward. For example, merchant efforts to promote the rewards also promote the brand, loyalty and purchasing behavior associated with the issuer's purchasing instrument. Such a relationship may provide an economic model that promotes mutually beneficial growth and value.

The customer may also benefit from a merchant-funded reward paradigm. For example, the customer may obtain a reward of greater value (actual or perceived) when the customer selects or "opts-in" to the merchant-funded reward. The customer may also be able to select rewards that better fit their priorities or needs.

By partnering with an issuer, the merchant may link its rewards program to a payment instrument that the customer may use at a variety of merchant locations. The customer benefits from a payment instrument that may be used ubiquitously at different merchant locations in different geographic locations.

The rewards program may also deepen customer loyalty to the merchant and/or issuer. For example, rewards offered by the merchant may be tied to other products or services offered by the merchant. The rewards may include offering the customer faster service or "bonus" products when making what otherwise would have been a routine purchase. Such rewards offered by the merchant may provide an incentive for customers to shop at a participating merchant location to earn and obtain the rewards.

The merchant may benefit by having the merchant's brand promoted as a reward option regardless of the customer's final rewards selection. The merchant may control marketing messages and behavior requirements delivered to customers. Furthermore, the issuer may promote the merchant's reward using one or more of the issuer's platforms for communication with customers. Additionally, the merchant may benefit by converting savings in card acceptance fees to marketing efforts that may increase sales.

From an issuer's perspective, the custom rewards paradigm provides a new and innovative product that enriches the issuer's value proposition associated with its purchasing instrument products. The issuer may also benefit by acquiring new customers as a result of the merchants marketing efforts.

System architecture may include mechanisms whereby merchants can submit rewards options and customers can opt-in to be eligible to earn the rewards alternatives. System architecture may also provide one or more sub-systems that enable deployment of varying fee structure for processing such transactions. The sub-systems may utilize unconventional communication protocols and/or hardware to meet or exceed timing requirements and industry standards associated with processing electronic payments. For example, industry standards may demand that not more than 2-3 seconds elapse from a time a customer swipes a payment instrument at a POS terminal until an authorization response is received from the issuer.

Because merchant-funded rewards may only be available at merchant locations, it may be desirable to determine customer eligibility for such rewards in real time at a POS. It also may desirable to determine customer eligibility for such rewards before the customer approaches a POS. Unconventional communication protocols and/or hardware may, in real-time, determine custom reward eligibility and merchant cost for a transaction.

In some embodiments, the merchant may be credited for transaction processing fees in a batch settlement at predetermined time intervals.

Notifications of rewards availability may be pushed to customer via mobile device apps. Such apps may be provided by the issuer, merchant or any suitable entity. Rewards availability may be determined based on any suitable factor. Illustrative factors include geolocation, spend analysis, market data and/or social media data.

Embodiments may include a rewards market place. Such a market place may include a real-time market where merchants may submit rewards and allowing customers to select rewards that meet their needs. In some embodiments, merchants may be able to view competitor's rewards submissions. Such a market place may provide a platform for real-time competition for customers.

Embodiments may include rewards routing protocols. Such protocols may include mechanisms by which a merchant is notified of a customer's rewards selection. Such a selection may trigger the customer's payment instrument enrollment in an alternative or bypass transaction processing network. The bypass transaction processing network may automatically track customer reward activity and apply appropriate fee schedules. Fee adjustments may include reductions/rebates in one or more fees collected by the acquirer.

Customer may select reward options such as whether to receive rewards in real-time or accrue rewards eligibility over time. Different rewards may be made available depending on whether the customer selects to accrue rewards or receive them in real-time.

Merchant-funded rewards and corresponding merchant benefits (e.g., transaction cost adjustments) may be tracked at the merchant POS terminal. For example, when a customer who has opted-in to a merchant-funded reward program checks out, fees typically charged to the merchant at the time of the transaction may be reduced or rebated. In some embodiments, the merchant may be responsible for providing systems and architecture for tracking rewards and custom rewards activity. In some embodiments, the issuer may provide systems and architecture for tracking rewards and custom rewards activity. Furthermore, such issuer systems may also track merchant credits for transactions. Credits may be earned by the merchant when a customer uses a payment instrument associated with a merchant-funded reward program. Systems and architecture may include transaction processing network integration to process reduced fees.

Embodiments may include integrating merchant credits and/or custom rewards into digital forms of payment other than traditional credit cards. For example, systems and architecture may integrate with a crypto currency marketplace.

Customers may use any preexisting payment instrument deemed eligible by the issuer for a rewards program. The customer may opt-in to a merchant-funded rewards program. In some embodiments, the merchant-funded rewards program may be an exclusive rewards program. For example, an opt-in to the merchant-funded rewards program may trigger an opt-out of other reward programs. Customers may opt-out of merchant-funded rewards programs at any time. Customers may opt back in to traditional rewards at any time.

To access a merchant-funded rewards program, a customer may use a payment instrument in possession of the customer before the merchant-funded rewards program is rolled out. An issuer may determine eligibility for merchant-funded rewards program. The issuer may provide notification of customer eligibility to a merchant in authorization response provided to the merchant.

Apparatus for a real-time, dynamic offer platform is provided. The platform may include a plurality of consumer devices. The platform may include a plurality of merchant devices. The platform may include a virtual display. The virtual display may be displayable on the plurality of consumer devices and/or on the plurality of merchant devices.

One of the merchant devices may transmit a selectable reward option to the platform. The transmission may be processed in real-time. The transmission may be processed using a batch mode processing. The virtual display may be configured to display the transmitted reward option.

The virtual display, displaying the transmitted reward option, may be displayable on the plurality of consumer devices and/or on the plurality of merchant devices. One of the consumer devices may receive a selection of the transmitted reward option. Upon receiving the selection, the consumer device may store the selected reward option.

At a point-of-sale, when the consumer device is used to finalize a purchase associated with the selected reward option, the consumer device may be configured to communicate with the point-of-sale. The communication may include termination of a custom communication exchange. A custom communication exchange may include communication between a consumer device, a merchant, an acquirer and an issuer. The consumer device communicates with a merchant. The merchant then communicates with an acquirer, which in turn communicates with an issuer. Intermediaries may facilitate the communication between the merchant and the issuer. Upon receipt of approval by the issuer, the issuer communicates the approval to the acquirer, and the acquirer communicates the approval back to the merchant. The communication may include generation of an updated custom communication exchange. The communication may include information about transaction economics as well as rewards information, transaction information, accrued benefits overall (total points displayed on the receipt), etc.

In some embodiments, the updated custom communication exchange may be transmitted from the point of sale directly to an issuer. It should be appreciated that, in these embodiments, an acquirer and/or network is removed from the communication exchange and/or the acquirer is replaced with a combined acquirer/issuer. In other embodiments, the updated custom communication exchange may be transmitted from the point of sale to an issuer, via an acquirer.

The updated custom communication exchange may include a revised interchange rate passed on to the merchant by the acquirer. The revised interchange rate may be passed on by the acquirer to the merchant associated with the point-of-sale device. The revised interchange rate may be less than an interchange rate included in the initial custom communication exchange. The updated custom communication exchange may include other updated fees that a merchant may pay, such as updated network fees or updated acquirer fees, associated with the processing of a transaction.

The updated custom communication exchange may include a purchase price associated with the purchase. The purchase price may be less than a purchase price included in the custom communication exchange. In some embodiments, the selected reward option may be a non-monetary reward. The non-monetary reward may include a free item, a free service and/or a free upgrade. The non-monetary reward may grant the customer access to exclusive products and/or services not available to the general public. The non-monetary reward may include enabling one or more purchases at a preferred shopping time. The non-monetary reward may include any other suitable non-monetary reward. In these embodiments, the purchase price may equal to a purchase price include in the custom communication exchange. Therefore, in order to communicate the selected reward option to the issuer, a selected reward option complete tag may be associated with the updated custom communication exchange.

The updated custom communication exchange may include a reward tag. The reward tag may be associated with the purchase of the item. The reward tag may be reset to zero from a non-zero value included in the custom communication exchange. The zero value may trigger removal of the purchase from a points eligibility list.

The updated custom communication exchange and/or the custom communication exchange may include interchange information, other transaction economic information, reward information, transaction information, accrued benefits total and any other suitable information. In some embodiments, the accrued benefits total or total points accrued for a specific card product may be displayed on a receipt on the customer.

The platform may be configured so that each merchant device may update offers, transmit additional offers and/or remove offers in real-time.

In some embodiments, the plurality of consumer devices may be a first plurality of consumer devices. The first plurality of consumer devices may be a second plurality of consumer devices. A consumer device included in the first plurality of consumer devices may be configured to share at least one selectable reward option with a subset of the second plurality of consumer devices. The subset may be a predefined subset. The subset may be distinct for each consumer device. The subset may be defined by the consumer device.

The consumer devices included in the subset may be configured to receive like and/or dislike comments to shared reward offers. The like and/or dislike comments may be displayed on the virtual display of the consumer devices included in the subset. The consumer devices included in the subset may be configured to receive a selection of the shared offers.

A method for rerouting a communication from a first network to a second network is provided. The first network may include a merchant. The merchant may be in communication with an acquirer. The acquirer may be in communication with an issuer. The second network may include at least one merchant. The merchant may be in direct communication with the issuer independent of communication with an acquirer. The second network may include one or more intermediaries to facilitate the communication.

The method may include receiving a selectable reward option at an offer platform. The reward option may be received from a merchant device. The merchant device may be included in a plurality of merchant devices.

The method may include displaying the reward option on a virtual display. The virtual display may be displayable on the plurality of merchant devices and on the plurality of consumer devices. The method may include receiving a selection of a selectable reward option from a consumer device. The method may include storing the selected reward option on the consumer device. The method may include storing the selected reward option on the offer platform.

The method may include receiving a request for a purchase communication at a point-of-sale associated with the merchant. The purchase communication may be associated with the selected reward option. Upon receipt of the request, a rerouting of the purchase communication via the second network may be triggered. The method may include transmitting the purchase communication directly from the merchant to the issuer via the second network. It should be appreciated that the merchant's cost of acceptance for use of the second network may be less than the merchant's cost of acceptance for use of the first network. In addition to cost of acceptance reductions, other economic incentives may be applied. The other economic incentives may include reduced network fees and/or reduced acquiring fees. Such fee reductions could be reduced to compensate the merchant for providing customers with custom reward programs.

In some embodiments, each selectable reward option may include a reward metadata file. The reward metadata file may include information such as geographic location information, target age information, market data, target income bracket and/or any other suitable information. In these embodiments, each consumer device may include a dynamic consumer metadata file. The dynamic consumer metadata file may include information such as current geographic location information, age information, spend trends and analysis, income information, social media data and/or any other suitable information. The dynamic consumer metadata file may be updated when a consumer enters a predetermined location. The location may be a shopping center. A consumer associated with the consumer device may enable and/or disable the updating of the dynamic consumer metadata file.

A processor may determine which reward options are relevant for which consumer devices based on a correlation value between the dynamic consumer metadata file and the reward metadata file being greater than a predetermined correlation value. The display of each consumer device may be configured to display the reward options that are determined to be relevant.

A system for offering rewards is provided. A reward may be provided by a merchant. The merchant may offer rewards based on location. A merchant may offer rewards that are specific to customer behavior. Such customer behavior may include geolocation, spend analysis, market data and social media data. Merchant may also create rewards that promote specific customer behavior. Such specific customer behavior may include online pre-ordering of services and/or products. Such specific customer behavior may include purchasing specific items.

Merchants may use the merchant-funded reward to steer or direct a desired customer behavior. For example, a merchant may provide a reward only if a customer uses a self-service check-out kiosk. A merchant may provide a reward only if a customer orders ahead with his/her mobile device. A merchant may provide a reward only if a customer shops within a desired department within a shop. A merchant may provide a reward only if a customer shops at a specific merchant location. A merchant may modify rewards in order to promote specific customer behavior at different locations, different seasons, various times of day or any other reason.

A new card product may offer merchant-funded rewards and reduce costs for the merchant. This may be the exclusive reward associated with this card. This card may be promoted by merchants because the card is associated with a lower net merchant discount. In some embodiments, custom rewards can be used to enhance an already existing card product offered by an issuer. For example, card products offered by the merchant may be eligible for opting into a custom rewards program or retaining an association with other rewards programs. In such embodiments, the other rewards programs may be the default rewards programs associated with the card product. In other embodiments, custom rewards may be the default rewards program and customer may opt-out of custom rewards and opt into another rewards program. In other embodiments, custom rewards may be the exclusive rewards program for a card product.

A custom rewards network may be used to handle custom reward products, such as the new card product. Using the custom rewards network, network and/or acquirer fees may be lowered by avoiding traditional network fees. Customers may opt-in to merchant-funded rewards. Upon customer opt-in, a shift may be triggered to the custom rewards network. Rewards may be offered at the point-of-sale. If a customer accepts, the transaction may be rerouted to the custom rewards network.

A social media platform may be created around the custom rewards network and/or card product. Cardholders may be able to share offers, receive offers and like and/or dislike offers on the social medial platform. It should be appreciated that the social media platform may extend to non-cardholders as well. Cardholders may be able to share offers with non-cardholders. This may encourage the non-card holders to apply for the new card.

A real-time market may be instantiated. The real-time market may enable merchants to offer customers a variety of reward choices. Customers may select rewards that meet their respective needs. Merchants may be able to view competitor's reward bids. The marketplace may create real-time competition for cardholder business.

FIG. 1a shows typical credit transaction flow 100. Flow 100 involves transaction participants such as the merchant, the customer, and transaction service providers that are identified below.

Settling the transaction may include the transaction network receiving a plurality of transactions from the acquirer. Each of the plurality of transactions may comprise an amount authorized by the issuer. The transaction network may debit an account of the issuer for the amount authorized and credit an account of the acquirer the amount authorized.

Settlement may include a transfer of funds between two or more transaction participants. The transfer may be a "book transfer," an inter-bank transfer or any suitable transfer between the transaction participants. A settlement network may transfer the funds between the transaction participants. Illustrative settlement networks may include the Federal Reserve Wire Network ("Fedwire") and other suitable settlement networks that are well known to those of ordinary skill in the art. The settlement network may be any suitable network linking one or more accounts of the transaction participants.

One transaction participant may collect a fee from another transaction participant. The fee may include a point-of-sale terminal rental fee, network fees and any other suitable fees. The fee may be a fixed fee for a transaction. The fee may be a percentage of a transaction. The fee may be a combination of a fixed fee and a percentage of the transaction.

Transaction networks and associated communication pathways are conventionally constructed to transfer fees from the acquirer, through the transaction processing network, to the issuer. For example, the issuer may transfer to the acquirer a purchase amount of the product, net fees. The collected fees may be used by a transaction participant to cover costs associated with the transaction. Exemplary costs may include acquiring credit customers, servicing credit accounts, providing incentives to retain customers, mitigating fraud, covering customer credit risk, group compensation and other expenses.

The acquirer may deduct fees from the amount that the acquirer pays the merchant in exchange for the product. Such a deduction may be called a "merchant discount." The merchant discount may include the acquirer's fee, interchange fee and other expenses.

At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with credit. At step 3, the issuer transmits to the customer a statement showing the purchase price ($100.00) due. The issuer collects the purchase price amount, along with interest and fees if appropriate, from the customer. At step 4, the issuer routes the purchase price amount ($100.00) through the transaction processing network to the acquirer. At step 5, the acquirer partially reimburses the merchant for the purchase price amount. In the example shown in FIG. 1a, the partial reimbursement is $98.00. The difference between the reimbursement amount ($98.00) and the purchase price amount ($100.00) is a two dollar ($2.00) transaction cost.

At step 6, the acquirer transfers a $1.50 interchange amount to the transaction processing network and pays a $0.07 fee to the transaction processing network. At step 7, the issuer transfers $0.05 to the transaction processing network.

TABLE 1

Net positions, by participant, based on transaction flow 100 (shown in FIG. 1a).

| Participant | Net ($) |
|---|---|
| Issuer | −0.05 |
| Acquirer | 0.43 |
| Transaction processing network | 1.62 |
| Merchant | −2.00 |
| Customer | 0 |

In transaction flow 100 (shown in FIG. 1a), the transaction fee is based on an exemplary merchant discount rate of 2%. The $1.50 interchange is based on an exemplary interchange rate of 1.5%. The interchange rate is typically set by the transaction processing network. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may refund or reimburse all and/or a portion of a merchant discount and/or interchange amount. Interchange rates may depend for each transaction processing network on merchant type and size, transaction processing method, transaction volume and other factors.

Currently, issuers may offer reward programs associated with credit and/or debit payment instruments. Such payment instruments may include credit cards, debit cards, instruments or devices that include a contact chip, such as an ISO14443-compliant contactless chip, or other electronic purchasing devices such as smart phones or tablets (collectively hereinafter, payment instruments). Payment instruments may include payment instrument information stored on a mobile device (e.g., smart phone) or accessible via a mobile device. Illustrative payment instrument information is shown below in Table 2.

TABLE 2

Illustrative Payment Instrument Information

Figure 1B:
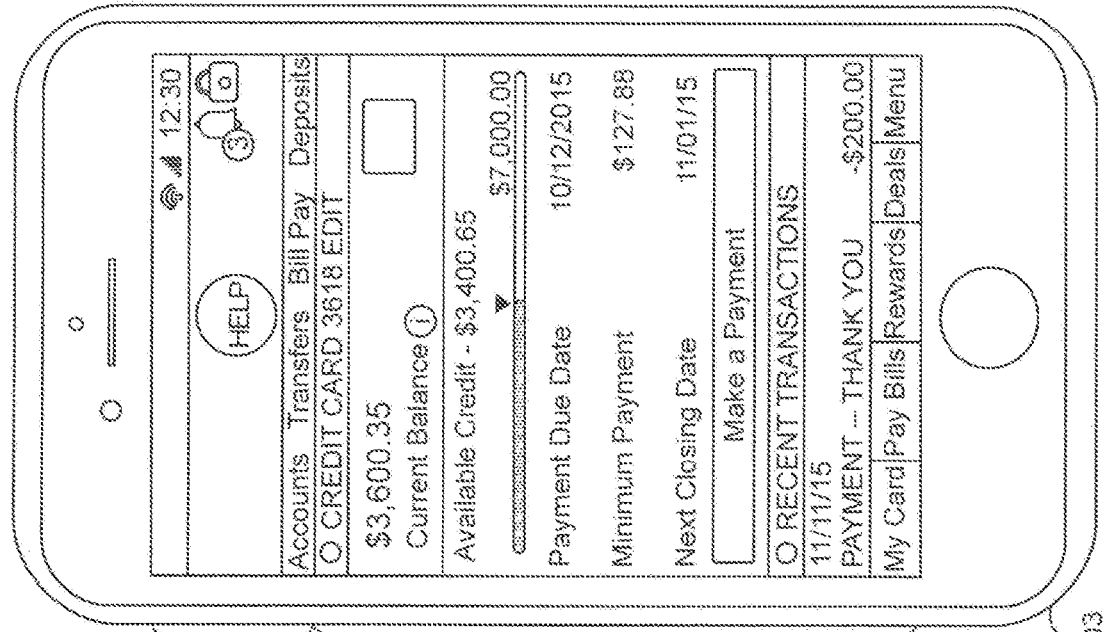
FIG. 1B shows views of an illustrative device presenting illustrative screenshots in accordance with principles of the invention.
Figure 1B:
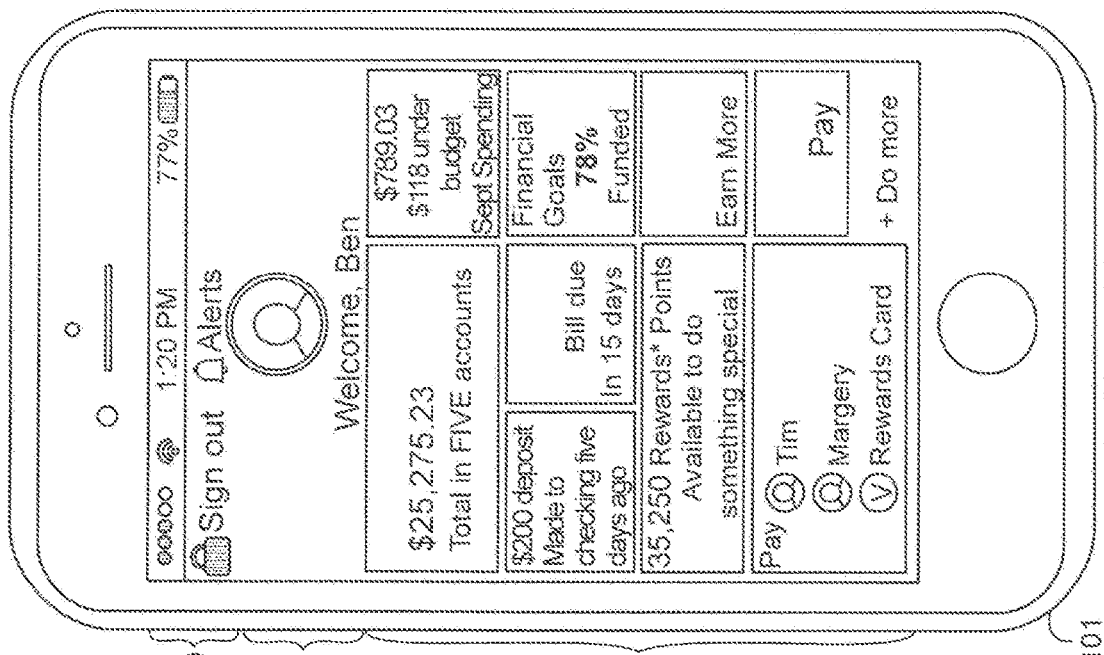

Issuer
Transaction network
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Brand
Rewards Program ID
Affinity FIG. 1B shows a device presenting an illustrative offer platform. The offer platform may include one or more than one user interface, such as graphic user interface ("GUI") 101 and/or GUI 103.

GUI 101 and/or GUI 103 may include one or more platform features. The platform features may include one or more "widgets", windows, virtual tabs, virtual buttons and/or virtual toggle switches.

GUI 101 may include a dashboard view. GUI 101 may include a welcome screen. GUI 101 may include features 109, features 111, and/or features 113.

Features 109 may enable logging into or out of one or more than one platform account. Features 109 may enable accessing of platform information, such as account alerts and/or notifications. Features 109 may enable accessing support and/or help information.

Features 111 may include the welcome screen. Features 111 may include one or more indications identifying the account(s). Features 111 may include photo(s) of one or more than one user associated with the account(s). Features 111 may include a name(s) and/or username(s) of the user(s).

Features 113 may present general account information associated with the account(s). Features 113 may facilitate accessing the account(s). Features 113 may facilitate transaction(s) with one or more third parties. Features 113 may facilitate accessing of GUI 103.

GUI 103 may include an account screen. GUI 103 may include detailed information associated with one or more of the account(s). GUI 103 may include features 115 and/or features 117. Features 115 may enable logging into or out of the account(s). Features 115 may enable accessing of additional account information, such as account alerts and/or notifications. Features 115 may enable accessing support, customer service and/or help information.

Features 117 may include detailed account data, such as account history and/or upcoming account events. Features 117 may facilitate making one or more payments to the account and/or updating account information. Features 117 may facilitate accessing of GUI 101.

Figure 1C:
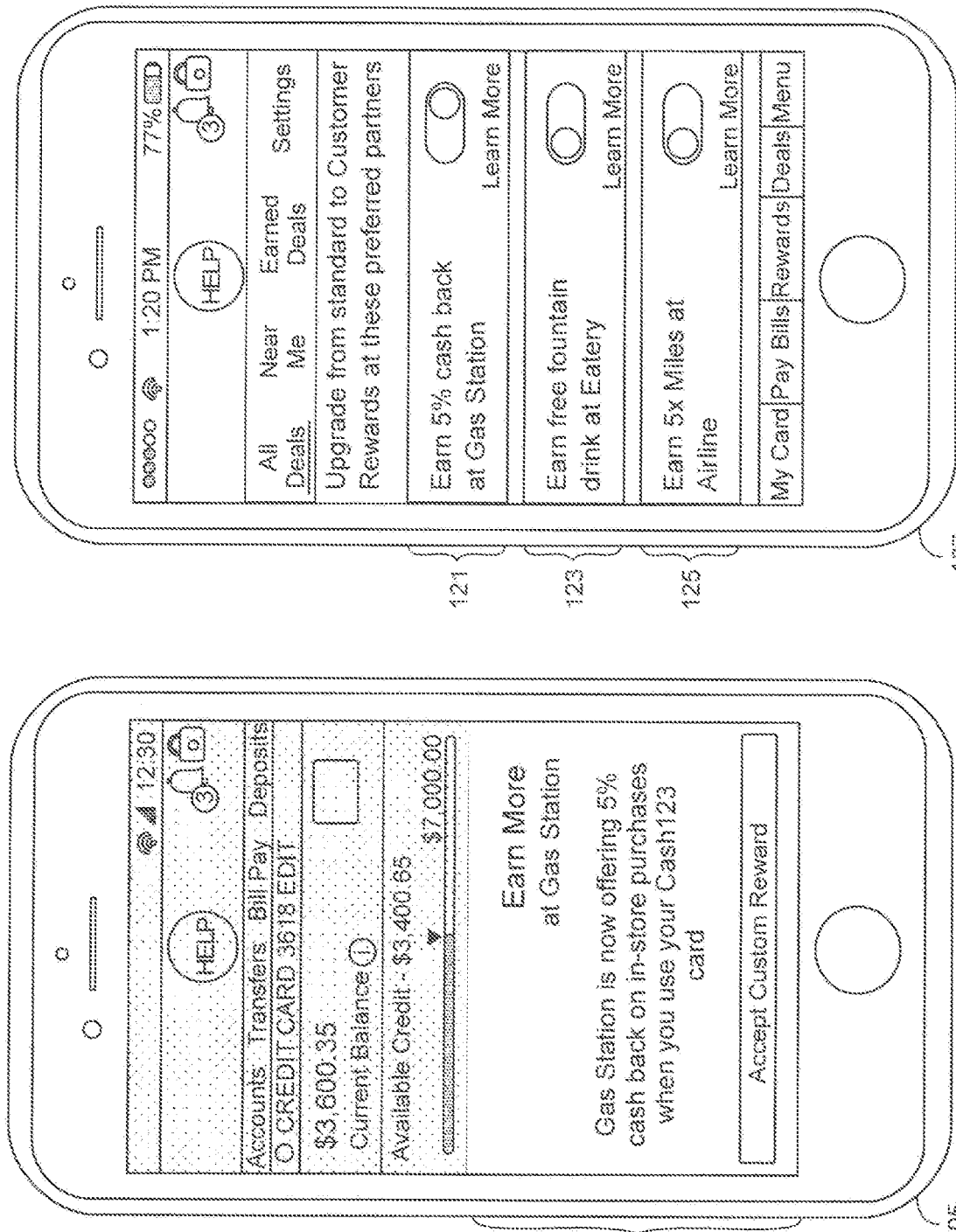
FIG. 1C shows views of the illustrative device, shown in FIG. 1B, presenting additional illustrative screenshots in accordance with principles of the invention.

FIG. 1C shows the device presenting an illustrative custom offer platform. The custom offer platform may include one or more than one user interface, such as GUI 105 and/or GUI 107. GUI 105 and/or GUI 107 may include one or more of the platform features described in connection with FIG. 1B.

GUI 105 may include one or more than one of the features described in connection with GUIs 101 and 103. GUI 105 may include proactive "shadow box" 119. Shadow box 119 may include one or more than one pop up window. Shadow box 119 may present one or more than one custom merchant reward offer associated with one or more than one payment instrument. Shadow box 119 may include general and/or detailed information regarding the offer(s). Shadow box 119 may include one or more than one of the features configured to facilitate accepting and/or registering for the offer(s).

Shadow box 119 may be configured to be presented in response to a triggering event. The event may include detected proximity of the user to a geographic location. The location may be associated with the offer, such as a location of a merchant presenting the offer. The event may include a detected purchase by the user associated with the offer, such as a purchase of a similar or related product and/or service. Presentation of shadow box 119 may be over GUI 103. The event may include activation of one or more of the features of GUI 101, GUI 103 and/or GUI 107.

Upon presentation of GUI 105, shadow box 119 may occlude one or more than one portion of GUI 103. Upon presentation of GUI 105, one or more than one remaining portion of GUI 103 may be shaded and/or inaccessible until removal of shadow box 119.

GUI 107 may include a customer rewards screen. GUI 107 may include some or all of the features described in connection with GUIs 101, 103 and 105. GUI 107 may present general information regarding one or more reward offers. For example, GUI 107 may include a "learn more" link that links the user to and/or navigates the user to a merchant website, application or other applicable medium where the merchant promotes the merchant brand, message, and/or reward value.

Figure 2:
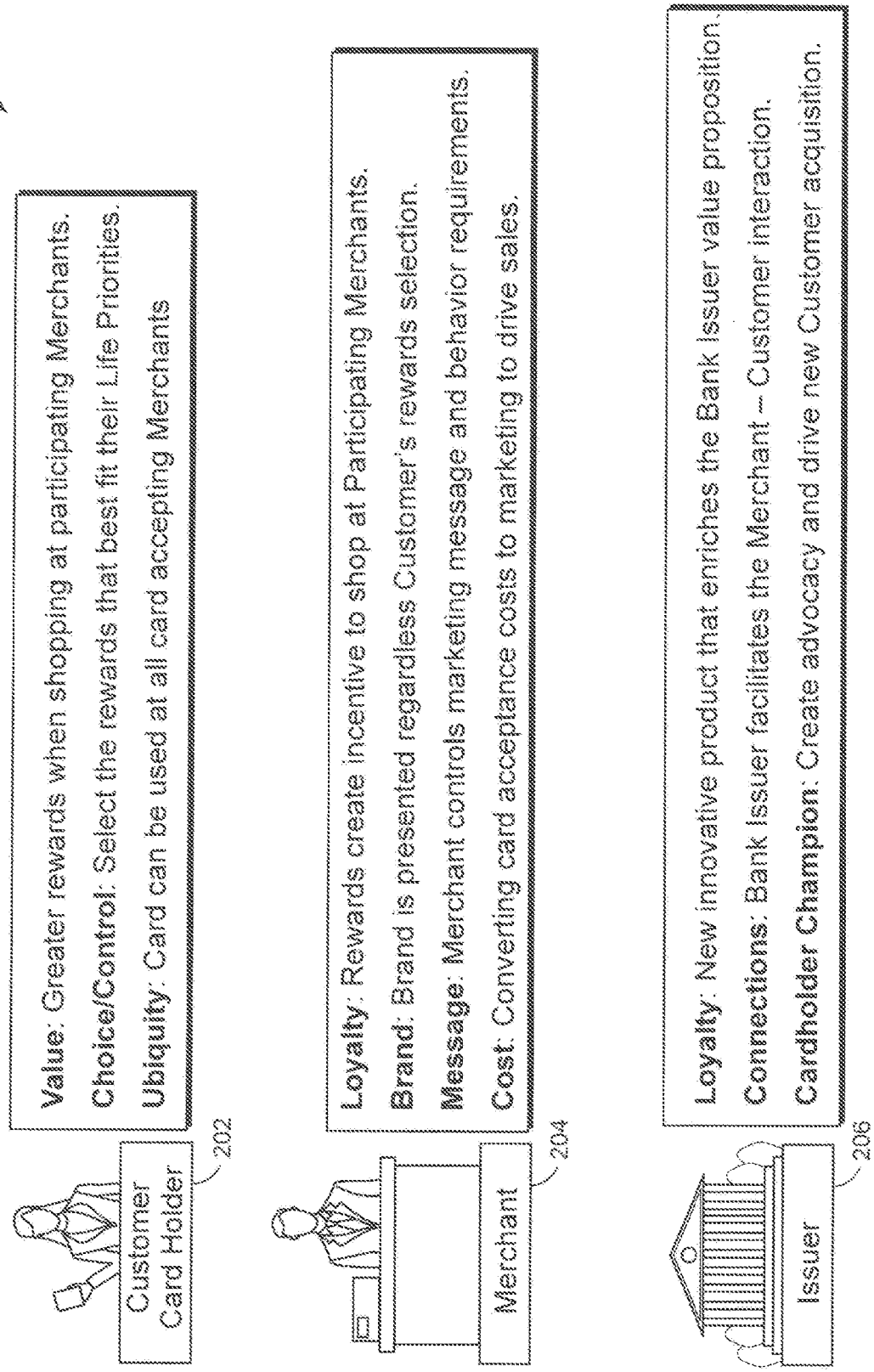
FIG. 2 shows an illustrative chart in accordance with principles of the invention

FIG. 2 shows an illustrative chart 200 showing the values a customer 202, a merchant 204 and a bank issuer 206 have when integrating the merchant-funded rewards program into a pre-existing payment instrument. Customer 202, merchant 204 and bank issuer 206 may all benefit from having the capability of switching communication exchange routes within a pre-existing payment instrument.

When using the merchant-funded rewards program, customer 202 may receive rewards that are greater in value than the standard rewards. Customer 202 may select the rewards that best fit their life priorities. Customer 202 may use the payment instrument at all merchants that accept the payment instrument.

Merchant 204 may benefit from participating in the merchant-funded rewards program. Providing merchant-based rewards may incentivize the customer to shop at participating merchants. Offering rewards and displaying the rewards in real-time to the customer may market the merchants brand regardless of whether the customer opts-in to the merchant-funded rewards program. In a merchant-funded rewards program architecture, merchant 204 may control its marketing message and behavior requirements. Merchant 204 may convert the card acceptance costs to marketing in order to drive sales.

Bank issuer 206 may benefit from participating in the merchant-funded rewards program. Bank issuer 206 may not lose out by participating with the merchant-funded rewards program. New innovative products of a merchant may enrich the bank issuer value proposition. Bank issuer 206 may gain from the direct interaction between the merchant and the issuer, thereby increasing sales while using a specific issuer-based card product. Bank issuer 206 may facilitate the merchant-customer interaction. Bank issuer 206 may create advocacy and drive new customer acquisition.

Figure 3:
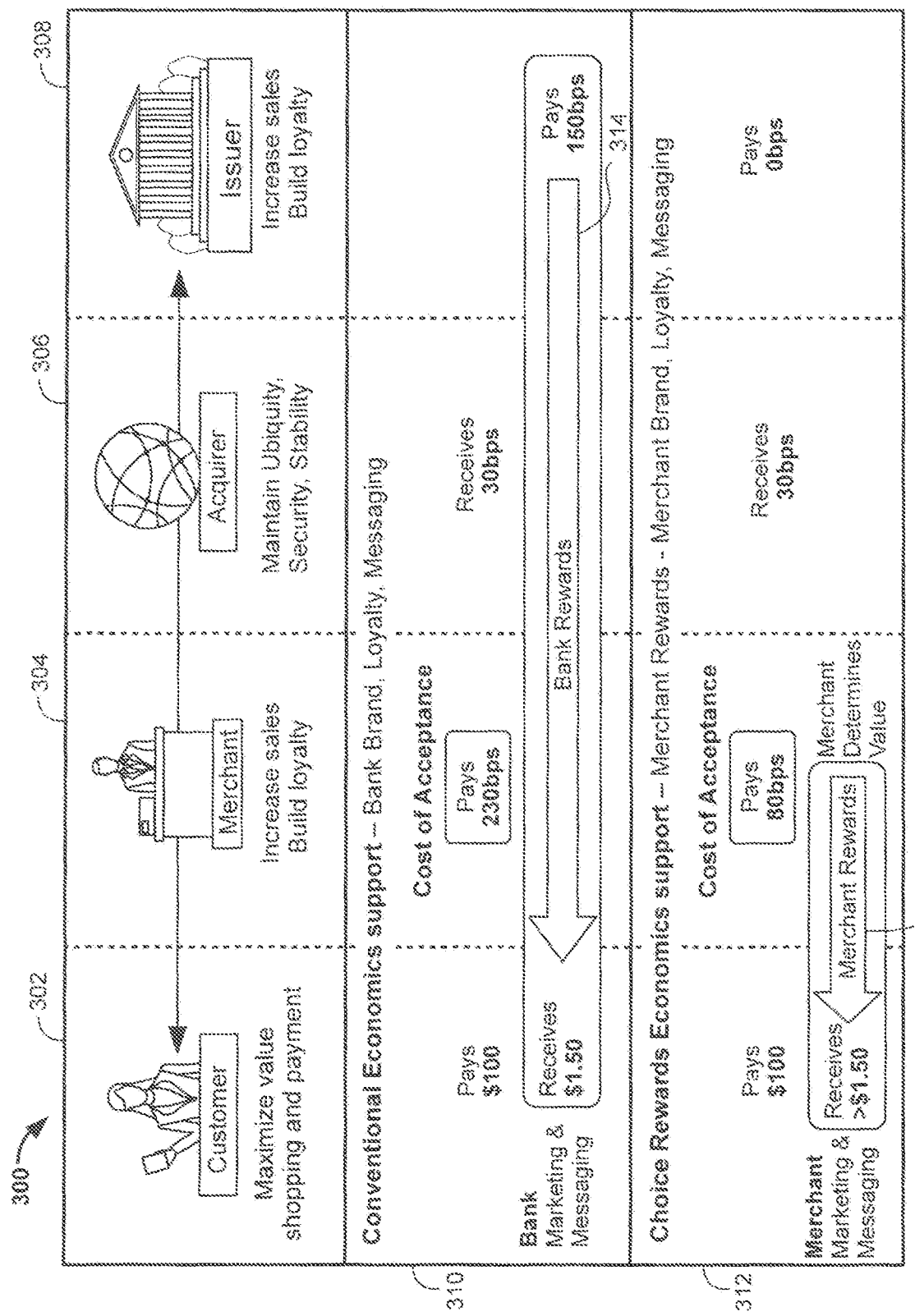
FIG. 3 shows an illustrative flow diagram in accordance with principles of the invention.

FIG. 3 shows an illustrative process flow 300. Process flow 300 shows values paid and received by transaction participants. An electronic payment processing system may provide hardware and software for transmitting and routing information between each transaction participant.

Column 302 shows illustrative values paid and received by a customer. A customer may seek to maximize a value of goods/services purchased from merchant 204. Column 302 shows that providing custom rewards may increase the value received by a customer.

Column 304 shows illustrative values paid and received by a merchant. A merchant may wish to increase sales volume and build customer loyalty. Column 304 shows that providing custom rewards may reduce expenses of a merchant.

Column 306 shows illustrative values paid/received by an acquirer/network. An acquirer/network may wish to maintain security, stability, and ubiquity of credit transactions. Column 302 shows that providing custom rewards may not affect revenue of an acquirer/network.

Column 308 shows illustrative values paid and received by an issuer. An issuer may wish to increase sales and build brand loyalty. Column 308 shows that providing custom rewards may increase the value received by an issuer.

In process flow 300, row 310 represents a distribution of value among transaction participants using a conventional rewards model. A conventional rewards model may be funded solely by an issuer. The economics of the conventional rewards model may reinforce the issuer bank brand, issuer customer loyalty, and marketing to an issuer bank customer base.

Row 312 represents a distribution of value among transaction participants associated with a credit transaction using a merchant funded rewards model. Economics of a merchant funded rewards model may also reinforce a merchant brand, merchant customer loyalty, and messaging to a merchant customer base.

Row 310 shows that a customer (column 302) may present a payment instrument at a POS terminal to initiate a purchase. The purchase price may be $100. The cost of acceptance, (or transaction cost or merchant discount), for the purchase may be imposed on the merchant. Column 304 shows an exemplary cost of acceptance imposed on a merchant.

Row 310 shows that in a conventional rewards model the merchant may pay value corresponding to 230 basis points ("bps"). Each bps may correspond to 0.01% of a purchase price. In row 310, the merchant may pay $2.30 as a transaction cost.

Column 306 shows that 30 bps of the transaction cost shown in row 310 (or $0.30) is received by the acquirer/network. Column 308 shows that 150 bps (or $1.50) is paid by the issuer as a bank reward 314. Reward 314 is ultimately received by the customer, as shown in column 302.

Row 312 shows an illustrative distribution of value among transaction participant using a merchant funded reward model. Row 312 shows a customer (column 302) may present a payment instrument at a POS terminal to initiate a purchase. The purchase price may be $100. The cost of acceptance of the credit transaction may be imposed on the merchant. The cost of acceptance is shown in column 304. Column 304 shows that merchant may pay 80 bps ($0.80) as a total transaction cost using the merchant funded reward model. This merchant transaction cost is 150 bps less than the merchant transaction cost imposed in row 310 using the conventional rewards model.

In row 312, 30 bps of the transaction cost ($0.30) is received by the acquirer/network. Process flow 300 shows that value received by the acquirer/network may remain the same under both rewards models. In some embodiments, under a merchant funded reward model, the value received by the acquirer/network may change. For example, the 30 bps amount may be lowered as a result of participating in a custom rewards program.

Column 304 shows that in row 310, a 150 bps transaction cost is paid by the issuer. Under the merchant funded rewards model, an issuer may not pay any value in rewards. Column 308 shows that a net value paid by the issuer in row 312 is 0 bps.

Column 304 shows that in row 312, the merchant transfers reward 316 directly to the customer (column 302). Reward 316 may be structured so that a cost to the merchant is less than a value of the reward received to the customer. In the exemplary transaction of row 312, the merchant may offer a reward that costs the merchant less than $1.50, yet the reward may have a value greater than $1.50 to the customer. A total transaction cost to the merchant may be less than the $2.30 transaction cost shown in row 310 under the conventional rewards model. Furthermore, reward 316 received by the customer (column 302) in row 312 may have a value greater than the $1.50 (item 314) in value received by the customer in row 310.

Figure 4:
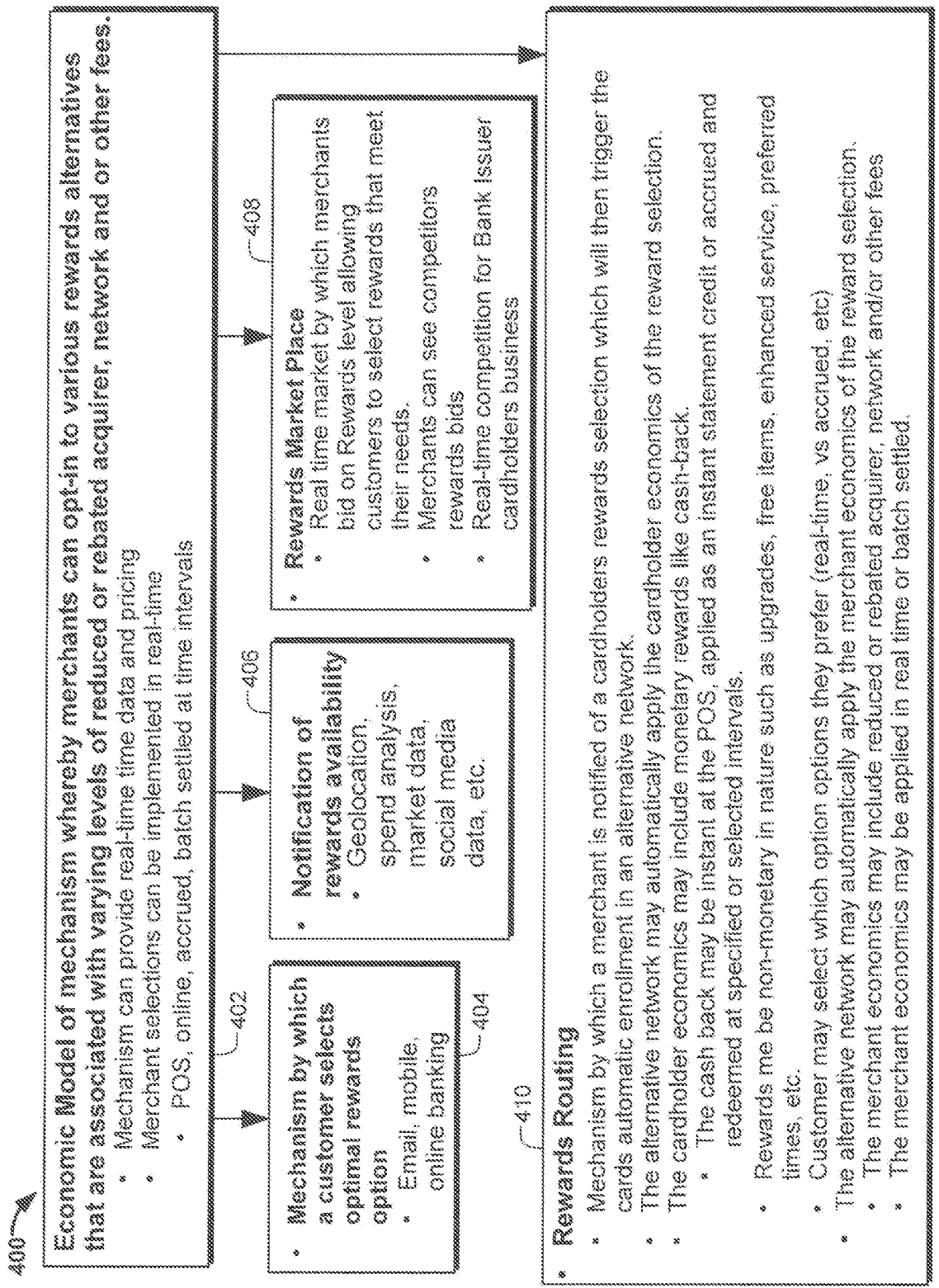
FIG. 4 shows an illustrative outline in accordance with principles of the invention.

FIG. 4 shows an illustrative outline 400. Outline 400 shows mechanisms (e.g., software and hardware) that may be used to implement a merchant funded rewards offer platform. 402 provides a high-level statement of functionality of a merchant funded rewards offer platform. A merchant funded rewards platform may include mechanisms for merchants to opt-in to various rewards alternatives that are associated with varying levels of reduced/rebated acquirer and/or network fees. A merchant funded rewards platform may include mechanisms that provide real-time data and pricing. Merchants may opt-in (or out) to a merchant funded reward program based on real-time data and pricing associated with a particular program. Merchant selections may be implemented in real-time. They may be implemented at a POS terminal. They may be implemented online. They may be accrued and/or batch settled at time intervals.

404 represents mechanisms for a customer to select optimal rewards options are described. A customer may select reward options via email, mobile and/or online banking.

406 represents mechanisms that provide notifications of custom reward availability. The notification may be triggered by geolocation, spend analysis, market data and or social media data.

408 represents mechanisms for implementing a rewards marketplace. The rewards marketplace may be a real-time market by which merchants may bid on a rewards level. The rewards level may enable customers to select rewards that meet their needs and/or standards. A rewards marketplace may enable merchants to view competitor's rewards bids. A rewards marketplace may enable real-time competition for bank issuer cardholder (or owner of any other payment instrument) business by offering various custom rewards for payment instrument.

410 represents mechanisms for routing rewards. When a merchant is notified of a cardholder's (or owner of any other payment instrument) rewards selection, the payment instrument may be enrolled in an alternative network. The alternative network may be configured to apply an economic model associated with the reward selection. The economic model may include monetary rewards. Illustrative monetary rewards may include cash-back rewards. The cash-back may be provided instantly at a POS. Cash-back may be applied as an instant statement credit or accrued and redeemed at specified and/or selected intervals.

Rewards may be non-monetary in nature. For example, rewards may be upgrades, free items, enhanced service and/or preferred service times. Mechanisms may allow customers to select which options they prefer. Options may include real-time or accrued rewards. The alternative network may apply a merchant's economic model to the reward selection. The economic model may include reduced (or rebated) acquirer and/or network fees. The reduction or rebate may be based on the reward offered by the merchant to a customer. The merchant selection of a reward to offer the customer may be based on the magnitude of the reduction. An economic model may be applied in real-time or may be batch settled.

Figure 5:
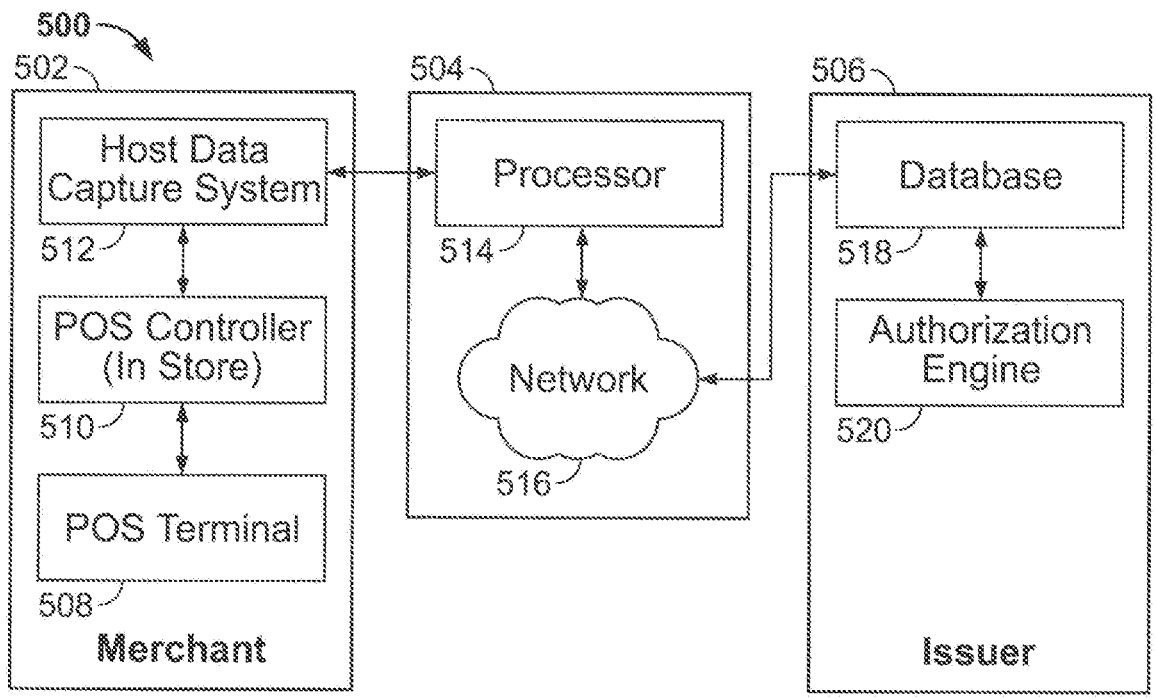
FIG. 5 shows an illustrative system in accordance with principles of the invention.

FIG. 5 shows illustrative system 500 for processing and communicating transaction information. System 500 may be used to track merchant funded rewards and corresponding merchant benefits. System 500 may be used to identify customers that are eligible for a custom reward. System 500 may be used to determine an appropriate custom reward to offer a customer at a POS terminal.

System 500 may include merchant component 502, network component 504 and issuer component 506. In general, a system such as 500 may include many merchant components such as 502, many issuer components such as 506 and many network components such as 504.

A customer may purchase goods by transferring customer information from a payment instrument, such as a credit card, to point-of-sale ("POS") terminal 508. POS terminal 508 may read or otherwise capture customer information from the card. The payment instrument may store data in a magnetic strip, a bar code, a silicon chip or any other suitable data storage device or format. The customer information may include issuer information, account information and any other suitable information.

POS terminal 508 may transmit transaction data to POS controller 510. POS controller 510 may ingest the transaction data. The transaction data may include some or all of the customer information and any other suitable information, such as the transaction amount, information regarding the purchased goods and one or more values associated with the transaction.

POS controller 510 may act as a server for providing user prompts and display layout information to one or more POS terminals such as POS terminal 508. POS controller 510 may receive and ingest transaction data from one or more of the POS terminals.

POS controller 510 may transmit transaction data to host data capture system 512. Host data capture system 512 may store transaction data received from POS controller 510. Host data capture system 512 may store accounting data, inventory data and other suitable data that may be included in the transaction information. A custom rewards offered at POS terminal 508 may be determined based on transaction data stored in host data capture system 512. "Ingesting" transaction data may include determining a custom reward for the ingested transaction data.

The transaction data may include information about the merchant, the merchant's business, the merchant's network membership, the merchant's business behavior and any other suitable information. Transaction information may include some or all of the information that is necessary to identify custom reward eligibility. Custom rewards eligibility, or determination of a specific custom reward to offer a customer, may depend on factors, such as customer spend rate, purchasing behavior, time/date, geolocation, interchange rate, network rates, merchant type, merchant size, transaction processing method, and any other suitable factors. Transaction data may include one or more of the foregoing factors and any other suitable factors.

The transaction information may be stored in any suitable element of merchant component 502, network component 504 and issuer component 506. For example, transaction cost information may be stored in processor 514. Processor 514 may include algorithms, including machine learning algorithms, that may be used to identify a custom reward for a customer transaction taking place at POS terminal 708.

For example, the merchant may offer different rewards to different customers. Offered rewards may depend of what the customer typically purchases (at the merchant or other merchants). Rewards may depend of a payment instrument used by the customer to complete a purchase. After a custom reward is identified, processor 514 may transmit the reward, via merchant components 502, to POS controller 510.

Host data capture system 512 may be configured to determine eligibility for a custom reward or merchant funded rewards program. Host data capture system 512 may track earning and spending of rewards associated with a payment instrument. POS controller 510 may be configured to determine eligibility for a rewards program and/or the earning or spending of custom rewards.

POS terminal 508 may have one or more interactive features that a customer may use. The features may provide the customer with information that may help the customer decide whether to execute a transaction. The customer may use the features to obtain more information about the merchant, the transaction, a custom reward, a custom rewards program, costs associated with different payment instruments, or any other suitable information.

Host data capture system 512 may route the transaction record to processor 514. The illustrative systems shown in FIGS. 5 and 6 may include one or more other processors that perform tasks that are appropriate for the components thereof.

Processor 514 may route the transaction record, via network 516, to database 518. Network 516 may be a default transaction processing network. Network 516 may be a bypass, or alternative, transaction processing network. The routing of a transaction record may be governed by the transaction data or rewards eligibility. For example, eligibility for a merchant funded rewards program may be associated with a bank issuer number ("BIN") that is encoded in the customer's payment instrument. Authorization engine 520 may render a transaction authorization decision based on the transaction data and/or transaction record.

Authorization engine 520 may transmit an authorization response back to POS terminal 508 through network 516, processor 514, host data capture system 512 and POS controller 510. The authorization response may include the authorization decision (e.g., "GRANTED" or "DENIED"). The authorization decision may include some or all of the transaction data or custom rewards information (e.g., specific rewards, eligibility or rewards accrued). The transaction data may be used by processor 514 to route the authorization decision back to the merchant and the POS terminal where the customer is present.

Figure 6:
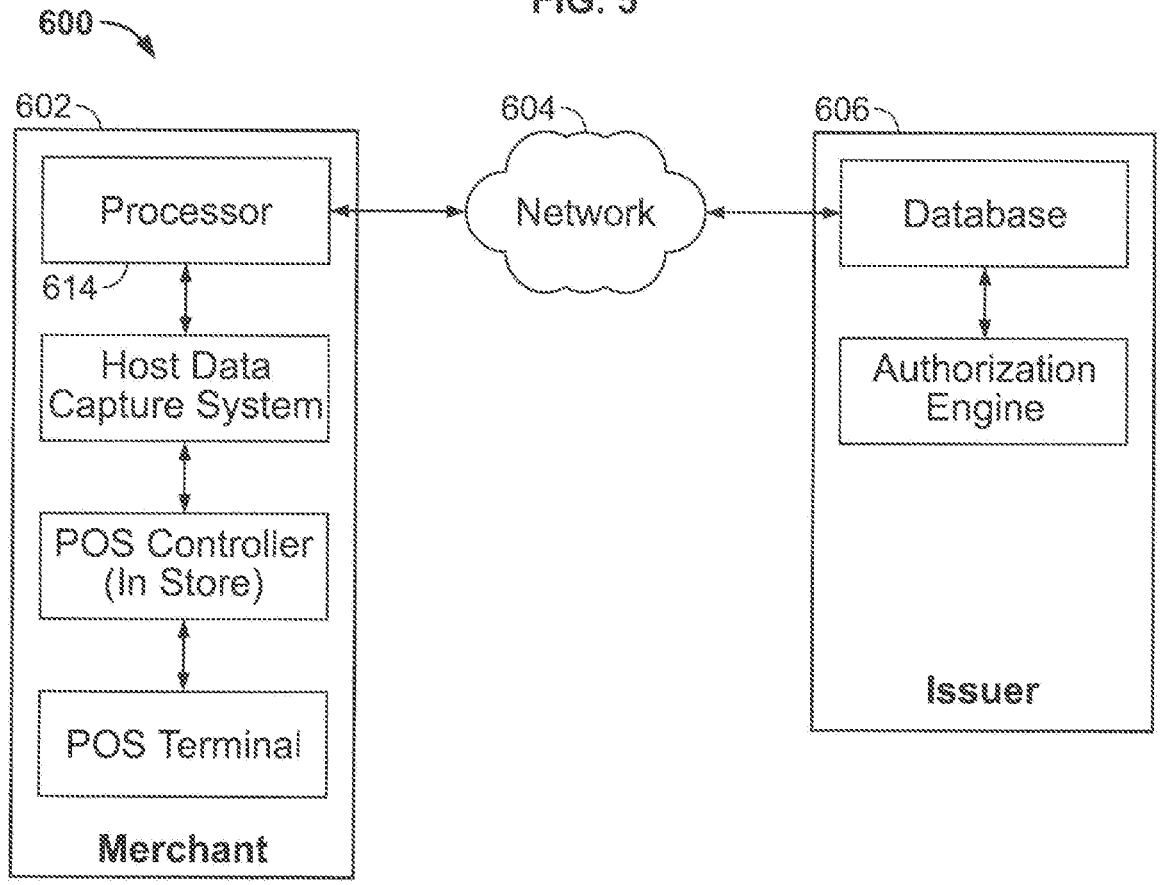
FIG. 6 shows another illustrative system in accordance with principles of the invention

FIG. 6 shows illustrative system 600 for processing and communicating payment instrument and transaction data. System 600 may include merchant component 602, network component 604 and issuer component 606. In general, a system such as 600 may include many merchant components such as 802 and many issuer components such as 606. System 600 may have one or more of the features that are described herein in connection with system 500.

In system 600, processor 614 may be present in merchant component 602. Corresponding processor 614 is present in network component 504 (shown in FIG. 5). In some embodiments, processor 614 may be present in issuer component 606. Processor 614 may be present in merchant component 602 or issuer component 606. Removing processor 614 from network component 604 may provide an unconventional communication pathway for implementing a bypass, or alternative, transaction processing network. Processes in accordance with the principles of the invention may include one or more features of the processes shown in FIGS. 1A-4.

Figure 7:
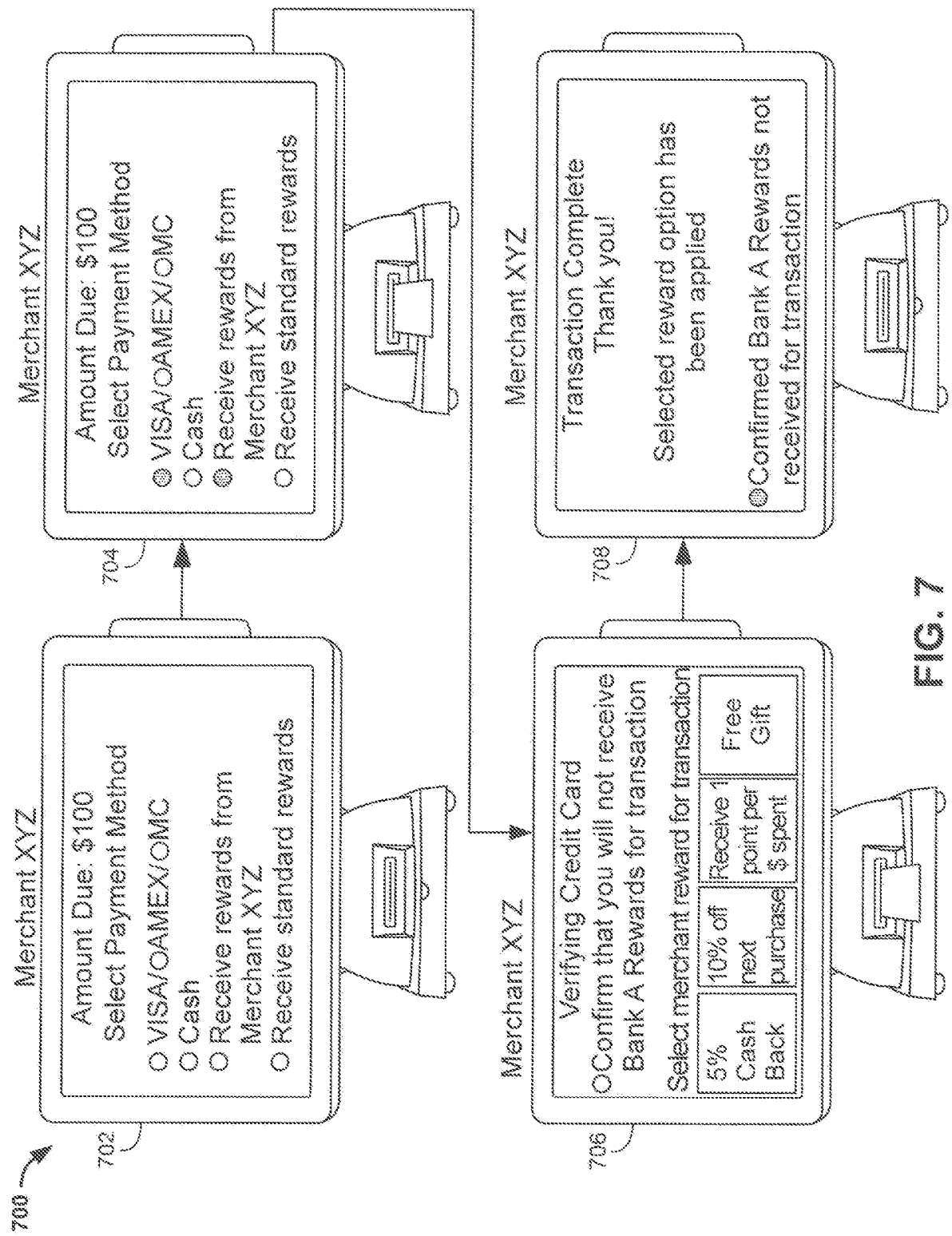
FIG. 7 shows another illustrative flow diagram in accordance with principles of the invention.

FIG. 7 shows illustrative POS terminal diagram 700. POS terminal 700 displays a virtual display of the different views of a POS terminal screen during a transaction in a merchant-funded rewards architecture. POS terminal 700 may be a self-service terminal but is not limited to being a self-service terminal.

Steps 702, 204, 706 and 708 may be the steps for the process of making a payment for a transaction by a customer at the POS terminal. At step 702 the screen may display the cost of the product being purchased. The customer may select the preferred payment method. The customer may select payment using a payment instrument. The customer may select payment using cash. The customer may prefer to use a payment instrument in order to receive rewards for the transaction. The customer may have the option for selecting the option to receive standard rewards from the bank issuer associated with the payment instrument. The customer may also have the option to select the option to receive rewards from the merchant of the POS terminal 700.

At step 704 the virtual display is displaying the option selected by the customer. The customer selected to pay for the transaction using his credit card. The customer further opted-in to receive merchant-based rewards and not issuer-based rewards which may be the standard rewards for the payment instrument. The issuer-based rewards program is now terminated for the transaction. Once the customer selects to opt-in to the merchant rewards architecture, the POS terminal may be configured to display the different reward options available, in real-time, to the customer. The customer may be enabled to select a reward from the different reward options to apply it to the transaction. The reward may be to receive 5% cash back for the transaction. The reward may be to receive 10% off the next purchase at the merchant of the POS terminal. The reward may be to receive an amount of points per dollar spent at the merchant of the POS terminal. The reward may be to receive a free gift from the merchant at the time of the purchase.

When a customer selects the preferred reward, the transaction is complete, as shows at step 708. The virtual display may display a confirmation that the rewards selected for the transaction were merchant-based rewards and not issuer-based rewards.

Figure 8:
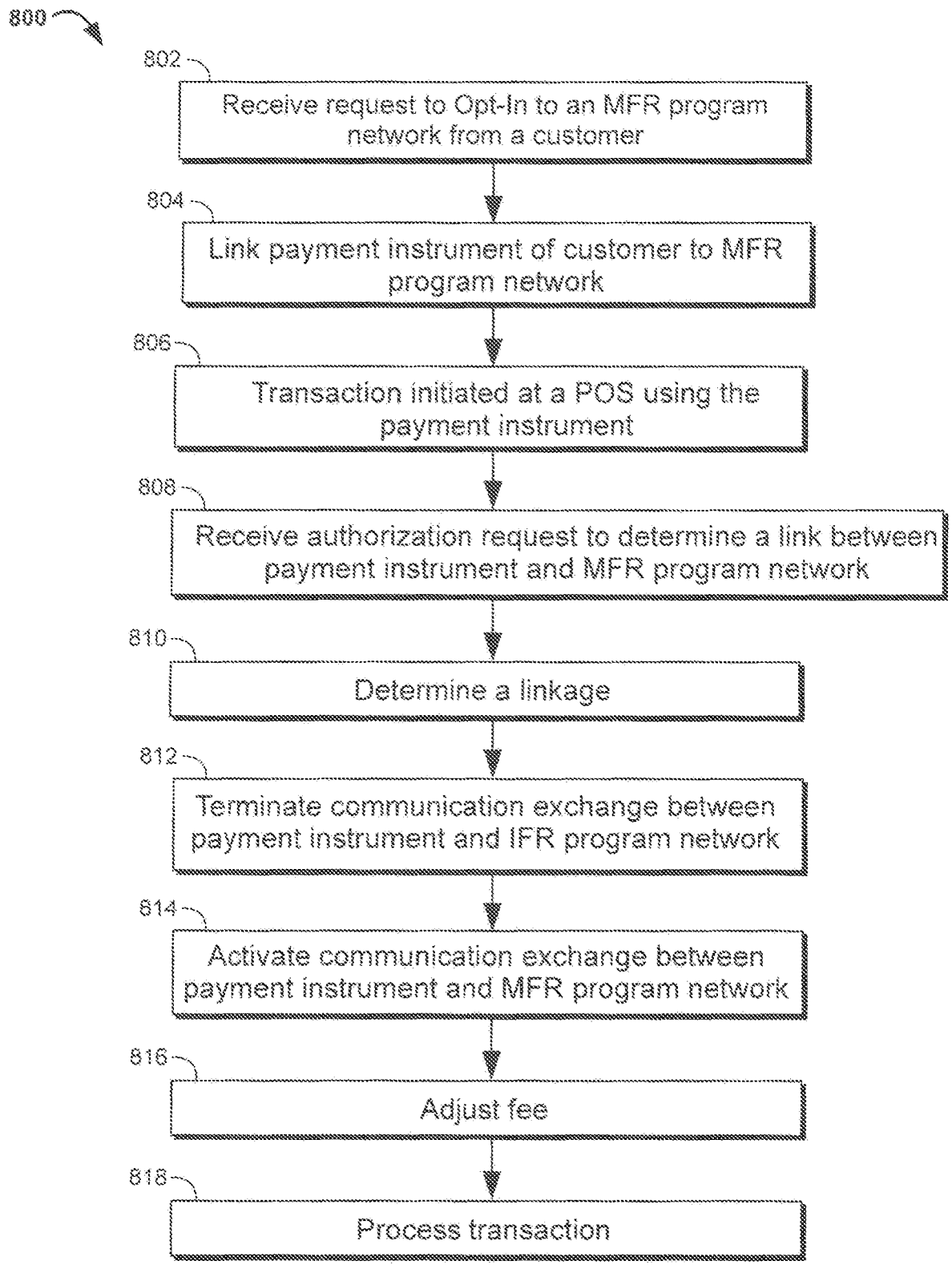
FIG. 8 shows an illustrative flow chart in accordance with principles of the invention.

FIG. 8 shows an illustrative flow chart 800 for a method of electronically processing credit card payments. At step 802 a request may be received in an electronic communication for a customer to link his payment instrument to an MFR program. At step 804 the payment instrument may be linked to the MFR program. When a transaction is initiated at a POS terminal, as shown at step 806, a payment authorization request to receive merchant-based rewards for the transaction may be received at the POS terminal at step 808. The authorization request may be sent to a processor to determine whether the payment instrument is linked to the MFR program. At step 810, the processor determines a linkage between the payment instrument and the MFR program. Once the linkage is determined, a communication exchange between the issuer and the payment instrument is terminated, as shown at step 812. Following the termination, a communication exchange between the payment instrument and the merchant is initiated at step 814. The fee may then be adjusted for the transaction as shown at 816. The transaction may then be processed as shown at step 818.

Thus, systems and methods for a custom rewards architecture with a custom protocol that enables customers, merchants, and issuers to utilize the architecture in real-time have been provided. Persons skilled in the art will appreciate that the present invention can be practiced by other than the described embodiments, which are presented for purposes of illustration rather than of limitation.

What is claimed is:

1. A method for rerouting, during a transaction occurring at a point-of-sale ("POS") terminal, a first communication exchange between the POS terminal and an issuer funded ("IF") rewards program network to a second communication exchange between the POS terminal and a merchant funded ("MF") rewards program network, the method comprising:
   activating the first communication exchange, the first communication exchange being a default communication exchange, the first communication exchange pre-existing a payment authorization request;
   receiving from the POS terminal the payment authorization request initiated by a payment instrument;
   in response to the receiving, displaying on the POS terminal at least two selectable reward program options, wherein the selectable reward program options comprise:
      a first option to link the MF rewards program network to the payment authorization request, the first option triggering a rerouting from the first communication exchange to the second communication exchange; and
      a second option to link the IF rewards program network to the payment authorization request, the second option triggering maintaining the first communication exchange;
   receiving a selected reward program option from the POS terminal within a pre-determined time limit, the selected reward program option being either the first or the second option, and if neither the first option nor the second option is selected within the pre-determined time limit, defaulting to the second option;
   transmitting the payment authorization request with the selected option to an issuer of the payment instrument;
   when the first option is selected:
      displaying on the POS terminal a selectable confirmation option, and in response to receiving the selected confirmation option:
         terminating the first communication exchange, the terminating further including terminating applying issuer-based rewards associated with the IF rewards program network to the payment request;
         activating the second communication exchange, the activating comprising rerouting the communication exchange from the POS terminal and the IF rewards program network to the POS terminal and the MF rewards program network;
         processing the payment authorization request;
         applying at least one machine learning algorithm to determine a plurality of custom selectable merchant-based rewards associated with the MF rewards program network for the transaction;
         displaying on the POS terminal the plurality of custom selectable merchant-based rewards;
         receiving a selected merchant-based reward;
         applying the selected merchant-based rewards; and
         providing a virtual display on the POS terminal confirming that rewards associated with the IF rewards program network were not applied; and
   when the second option is selected:
      displaying on the POS terminal a confirmation that rewards associated with the IF rewards program network will be applied:
      processing the first communication exchange;
      processing the payment authorization request; and
      applying rewards associated with the IF rewards program network.

2. The method of claim 1 wherein the pre-determined time limit is 3 seconds.

3. The method of claim 1 wherein the merchant-based rewards include an upgrade, a free item, cash-back, an enhanced service and a preferred service time.

4. The method of claim 1 wherein the processing further comprises determining that the payment instrument is a participant of the MF rewards program network.

5. The method of claim 4 further comprising providing a customer with an issuer-based reward when the merchant is determined not to be a participant of the MF rewards program network.

6. A merchant point-of-sale ("POS") system architecture, the system architecture configured to reroute, during a transaction occurring at a POS terminal, a first communication exchange between the POS terminal and an issuer funded ("IF") rewards program network to a second communication exchange between the POS terminal and a merchant funded ("H") rewards program network, the system architecture comprising:

the POS terminal including:
- a POS receiver configured to receive a payment authorization request;
- a processor configured to, prior to receipt of the payment authorization request, activate the first communication exchange, the first communication exchange being a default communication exchange;
- a virtual display configured to display selectable reward program options prior to processing the payment authorization request, the selectable reward program options comprising:
  - a first option to link the MF rewards program network to the payment authorization request, the first option triggering a rerouting from the first communication exchange to the second communication exchange; and
  - a second option to link the IF rewards program network to the payment authorization request, the second option triggering maintaining the first communication exchange;
- the POS receiver being further configured to receive a selected reward program option from the virtual display within a pre-determined time limit, the selected reward program option being the first or second option, and if neither the first option nor the second option is selected within the pre-determined time limit, configured to default to the second option; and
- a transmitter configured to transmit the payment authorization request and the selected option to a transaction processing network associated with an issuer of a payment instrument; and the transaction processing network including:
- a network receiver configured to receive the payment authorization request; and
- a processor configured to process the payment authorization request;

wherein:

when the first option is selected, the processor is configured to:
- provide a virtual display on the POS terminal including a selectable confirmation option, and in response to receiving the selected confirmation option;
- terminate the first communication exchange, the terminating further including terminating applying issuer-funded rewards associated with the IF rewards program network to the payment request;
- activate the second communication exchange, the activating comprising rerouting the communication exchange from the POS terminal and the IF rewards program network to the POS terminal and the MF rewards program network;
- process the payment authorization request;
- apply at least one machine learning algorithm to determine a plurality of custom selectable merchant-based rewards associated with the MF rewards program network for the transaction;
- display on the POS terminal the plurality of custom selectable merchant-based rewards;
- receive a selected merchant-based reward; and
- apply the selected merchant-based reward; and when the second option is selected, the processor is configured to:
- process the first communication exchange;
- process the payment authorization request; and
- apply issuer-funded rewards associated with the IF rewards program network.

7. The system architecture of claim 6 wherein when the second option is selected the processor is further configured to, prior to processing the payment authorization request:
- terminate the second communication exchange between the POS terminal and the MF rewards program network; and
- restart the first communication exchange between the POS terminal and the IF rewards program network.

8. The system architecture of claim 6 wherein when the payment authorization request is being processed, the processor is further configured to determine that the payment instrument is a participant of the MF rewards program network.

9. The system architecture of claim 6 wherein the pre-determined time limit is three seconds.

* * * * *